July 26, 1938.  L. H. BRINKMAN  2,124,961
METAL DRAWING DEVICE
Filed Jan. 28, 1933  2 Sheets-Sheet 2
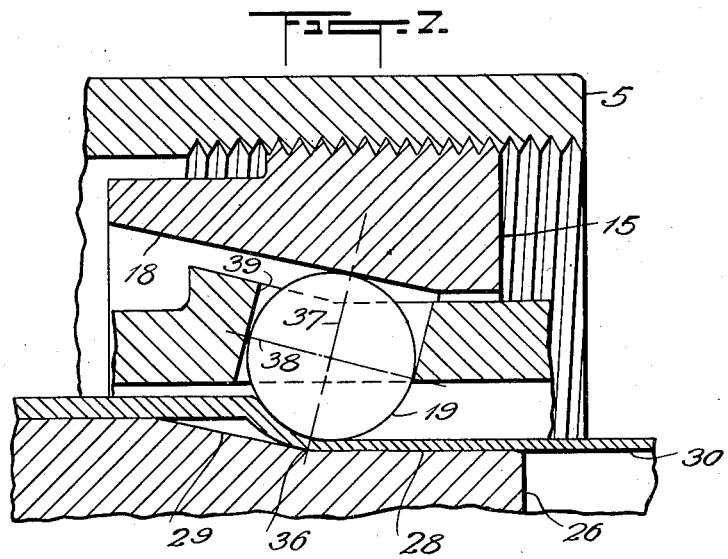
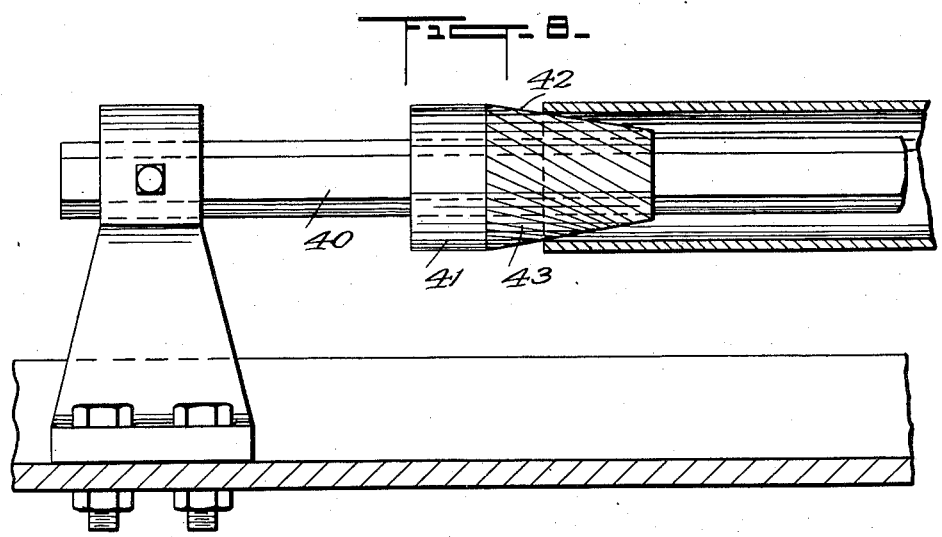
INVENTOR.
Louis H. Brinkman
BY
Lyman E. Dodge
ATTORNEY.

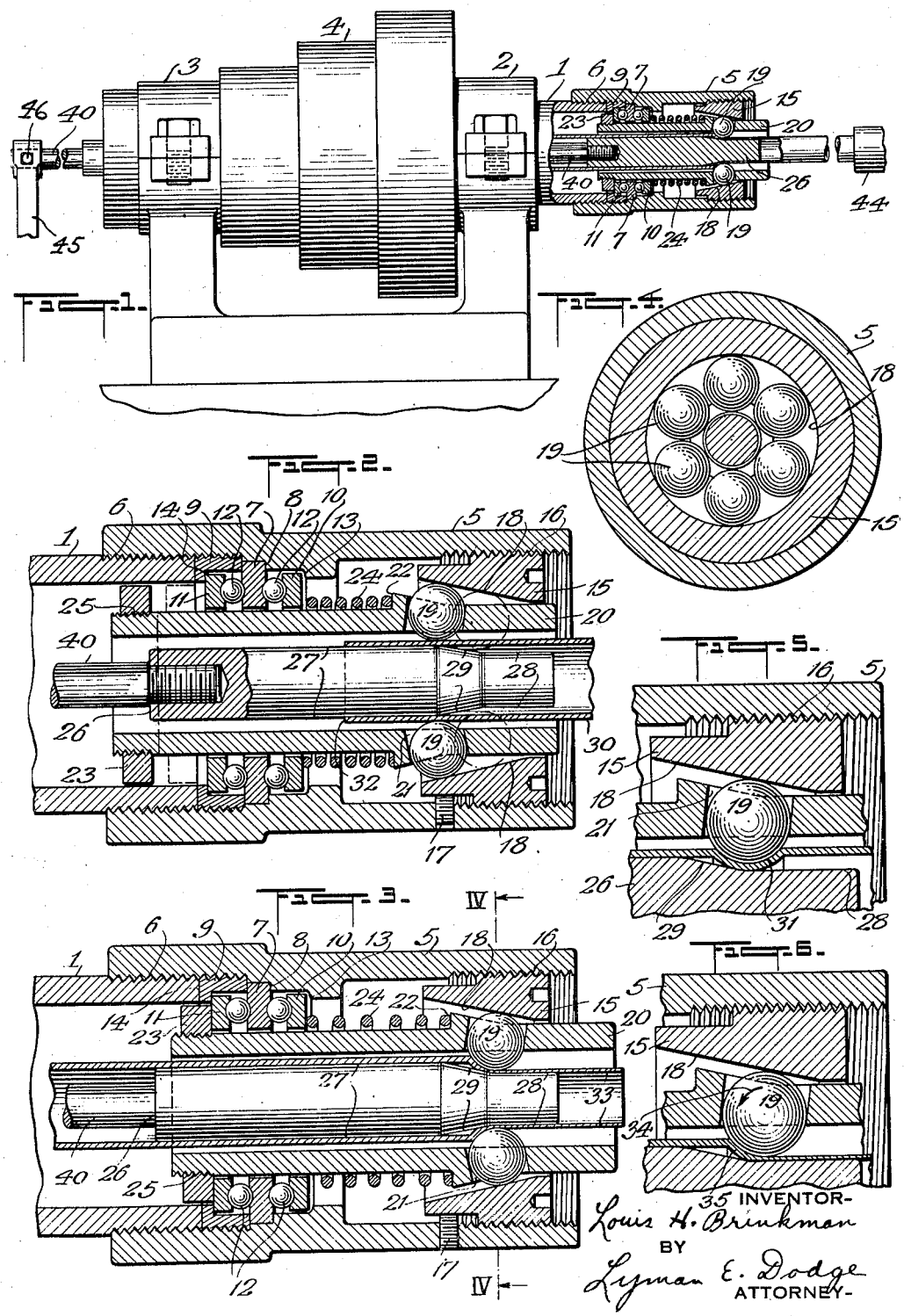

UNITED STATES PATENT OFFICE 2,124,961

METAL DRAWING DEVICE

Louis H. Brinkman, Glen Ridge, N. J; Laura Brinkman administratrix of Louis H. Brinkman, deceased, assignor of one-third to Laura Brinkman and one-third to Blanche Moriarty, both of White Plains, N. Y., and one-third to Natalie B. Cocke, Birmingham, Ala.

Application January 28, 1933, Serial No. 653,950

12 Claims. (Cl. 80—12)

This invention relates to metal working, particularly the working of metal pipes or tubes, and more especially the drawing down or reduction in thickness of the wall of a pipe or tube.

A principal object of this invention is to provide a device by which a maximum of reduction in the thickness of the wall of a pipe or tube may be made at the greatest speed, using the minimum of power, and with the smallest amount of waste.

Other objects and advantages will appear as the description of the particular physical embodiment selected to illustrate the invention progresses, and the novel features will be particularly pointed out in the appended claims.

In describing the invention in detail, and the particular physical embodiment selected to illustrate the invention, reference is had to the accompanying drawings and the several views thereon, in which like characters of reference are used to designate like parts throughout the several views, and in which:

Figure 1 is a side elevational view, partly in section, of a drawing head embodying applicant's invention; Fig. 2 is an enlarged longitudinal sectional view of that portion of the drawing head to which applicant's invention particularly relates; Fig. 3 is another cross-sectional view corresponding to the cross-sectional view, Fig. 2, but with the parts in a slightly different position, in order to illustrate the method of operation thereof; Fig. 4 is a cross-sectional view on the plane indicated by the line IV—IV of Fig. 3, viewed in the direction of the arrows at the ends of the line; Fig. 5 is a fragmentary longitudinal sectional view particularly illustrating the position of one of the parts in drawing a tube; Fig. 6 is a view similar to Fig. 5 but illustrating a different position of the same part of the device in drawing a tube; Fig. 7 is a fragmentary longitudinal sectional view, similar to Fig. 6, but enlarged so as to more clearly show the relation of the parts; Fig. 8, is a view of a pipe restraining member.

Numeral 1 designates a rotatable member supported by the bearings 2 and 3, and having the driving cone pulley 4 attached thereto. The rotatable member 1 may be called an arbor, and might well be the arbor of an ordinary lathe of the type including a hollow head stock arbor.

In the particular form of the invention shown in the drawings, applicant attaches a casing 5 to the arbor 1 in any appropriate or suitable manner, but for the purpose of illustration, applicant has shown the connection as a screw joint, 6.

The casing 5 carries a thrust bearing. This thrust bearing, in the form shown by applicant, includes the central thrust member proper, 7, which is held rigidly by the casing by being positioned between a shoulder 8 of the casing and an annulus 9 cooperating and engaging with the same thread 6 which is used to attach the casing to the arbor. On each side of the member 7 are the oppositely acting thrust plates 10 and 11 cooperating with the central plate 7 by means of the balls, as 12. The member 10 is restrained in one direction by the shoulder 13 on the casing 5, and the member 11 is restrained in one direction by the shoulder 14 on the annulus 9.

Applicant's invention includes a sloping face for engagement with metal working balls. In the particular form shown in the drawings, applicant has produced the sloping face by positioning a ball driving ring 15 in the outer end of the casing 5. Applicant prefers to produce mutually cooperating screw threads 16 upon the outer periphery of the ball driving ring 15 and the inner surface of the casing 5. By such means the ball driving ring 15 may be accurately positioned longitudinally of the casing head 5. When the exact position desired has been obtained, the ring is secured by the set screw 17. The inner surface 18 of the ball driving ring or annulus 15 is sloped so that the internal diameter is larger at one end than it is at the other end.

Applicant provides a circle of metal balls 19, preferably steel, best shown in Fig. 4, which engage with the sloping face 18 of the annulus 15. When the casing 5 is rotated, the annulus 9 being driven with it, its inner face causes the balls 19 to be rotated upon their own axis and revolved about the center of the circle.

In order to hold the balls 19 in proper position, applicant provides the ball cage 20 provided with suitable apertures, as 21, to receive the balls. The ball cage 20 is provided with oppositely disposed stops 22 and 23. One stop 23 is positioned so as to engage with the side plate 11 and directly limits the movement of the balls 19 to the right, as viewed in Fig. 2. Stop 22 cooperates with the plate 10 through the intermediary of a helical spring 24 positioned between the stop 22 and the plate 10. The stop 22 acting with the spring 24 limits the movement of the balls 19 in a direction toward the left, as viewed in Fig. 2. Applicant prefers to make the stop 23 adjustable longitudinally of the ball cage, and to that end, applicant prefers to arrange the ball cage and the stop 23 with the cooperating screw threads 25.

Positioned within the circle of balls is the mandrel 26. This mandrel, in the preferred form, comprises a cylindrical portion 27, and a smaller cylindrical portion 28 connected to the larger portion by the frustum of a cone 29. The mandrel 26 cooperates with a holding and adjusting rod 40 which, as shown in Fig. 1, preferably passes through the hollow arbor 1 and cooperates with a fixed stop 45 attached to any desired fixed point. The relation between the fixed stop 45 and the rod 40 is adjustable by means of the set screw 46.

In the preferred form of applicant's invention the slope 18 of the annulus 15 is substantially parallel to the slope of the frustum 29.

Figure 3 shows the position of the ball cage and the balls as they appear when no pipe is being worked upon. Fig. 2 shows the position of the ball cage and the balls 19 after a pipe 30 has been pushed in between the mandrel 26 and the balls 19. The pushing in of the pipe 30 acting against the balls 19 has the effect of forcing those balls 19 down the slope 18, that is, toward the larger internal diameter of the annulus. This movement of balls 19 takes place against the resistance of the helical spring 24 and results in a movement of stop 23 away from plate 11.

If all the parts are as shown in Fig. 2, and the casing 5 is caused to rotate, and at the same time the pipe 30 is pulled to the right, as viewed in Fig. 2, by device 44, as shown in Fig. 2 then the balls 19 and the sloping surface 18 act somewhat as the ordinary and well known spring ball clutch, that is, the balls move up the slope 18 toward the smaller internal diameter, and while doing so gradually force the metal of the pipe 30 inwardly against the sloping surface of the frustum 29. If the pull is continued, the pipe 30 will move to the right, as viewed in Fig. 2, and the balls 19 will arrive at the position of the balls as shown in Fig. 3, but in doing so, the pipe will have a groove 31 formed therein, as shown in Fig. 5. If the pull upon the pipe 30 is continued then all of the pipe between the groove thereby formed and the inner end of the pipe, that is, the end 32, as shown in Fig. 2, will be reduced in diameter so that it will be of the diameter as that shown at 33 in Fig. 3.

If after the pipe has been reduced from the first formed groove to the near end of the pipe, the pipe is then reversed end for end and pushed back over the mandrel far enough, it will then appear as shown in Fig. 3. If after the pipe is reversed end for end and pushed in over the mandrel, as shown in Fig. 3, it is then pulled to the right, as viewed in Fig. 3, the entire pipe will be reduced both in thickness of wall and in diameter so as to be that diameter and wall thickness as shown at 33 in Fig. 3.

Fig. 6 shows on a somewhat enlarged scale, the action of a ball 19 against a shoulder in reducing a pipe. The action of the ball 19 is such that it not only revolves upon its own axis and circumferentially of the pipe or tube being worked upon, but due to the pull upon the pipe, it also revolves in the direction of the arrow 34, so that the pull causes the balls to roll down the metal of the shoulder 35 so that the amount of pull required upon the pipe is very much less than one would anticipate.

In practice applicant has, driving the casing 5 at 2500 revolutions per minute, worked the metal of a brass pipe of two and five eighths inches in diameter down to two inches in diameter, and from a wall thickness of eighty one thousandths of an inch to a wall thickness of seventeen one thousandths of an inch at the rate of ten feet per minute, with one draw through the head.

In Fig. 7, the optimum relation between the parts is shown. The sloping driving surface 18 drives the balls 19 by contact with, substantially, the end of a diameter. The other end of this diameter, prolonged, when the balls are operating to reduce, as in Fig. 3, intersects the mandrel 26 at the point 36, which is substantially the point of intersection of the frustum 29 with the smaller cylinder 26. Each ball therefore, rotates on its diameter at a right angle to line 37, that is on diameter 38.

In order to reduce the friction of the balls 19 on the cage as much as possible, the circular sides 39 are formed perpendicular to slope 18. By this means the balls bear substantially on the ends of a diameter, at a right angle to their rotation.

The action of the balls 19 on the pipe 30 may cause it to revolve. If the left hand end, as viewed in Fig. 2, is quite long, a considerable vibration is set up. If this occurs, in order to prevent it, applicant provides a holding and adjusting rod 40 of polygonal section, preferably hexagonal. On the holding rod 40, applicant positions a pipe clamp 41. This clamp 41 is provided with a bore just fitting the rod 40, so that the clamp may slide endwise freely. The surface, 42, of the clamp is made conical and formed into a screw thread 43. The clamp is quite forcibly pushed into the end of the pipe, as 30, whereupon if the pipe starts to turn it is soon stopped by the resistance produced by the metal of the pipe being forced into the screw thread 43.

Although I have particularly described one particular physical embodiment of my invention and explained the principle, mode of operation, and construction thereof, nevertheless, I desire to have it understood that the form selected is merely illustrative but does not exhaust the possible physical embodiments of the idea of means underlying my invention.

What I claim as new and desire to secure by Letters Patent of the United States, is:

1. In a tube drawing head, in combination: a mandrel formed of two cylindrical portions, one larger in diameter than the other, joined by substantially a frustum of a cone; means for holding and adjusting the mandrel longitudinally; a plurality of balls arranged in a circle about the mandrel; an annulus formed with an inside sloping face substantially parallel to the slope of the frustum and of larger internal diameter at the end in the direction of the base of the frustum; a casing; means for rotating the casing; a thrust bearing carried by the casing; a ball cage engaging the balls; two stops, oppositely disposed, on the ball cage, one, directly engaging the thrust bearing limiting the travel of the balls down the slope of the annulus toward its smaller internal diameter, the other, limiting the travel of the balls toward the larger internal diameter end of the annulus.

2. In a tube drawing machine, in combination: a rotatable casing; means for rotating the casing; a ball driving ring formed with a sloping inner face; means for attaching said ring to the inner face of said casing; a ball bearing arranged to resist thrust in either or both of two opposite directions; a ball cage formed with two oppositely disposed spaced shoulders, one of the shoulders positioned to directly engage one side of the thrust bearing, and a spring between the other side of the thrust bearing and the other shoulder whereby the ball cage may be moved longitudinally relatively to the casing and when free returns to a normal position by action of the said spring; an elongated cylindrical mandrel positioned and held with its longitudinal axis corresponding with the longitudinal axis of the casing, said mandrel formed of two portions of different diameter connected by a frustum of a cone, the slope downwardly of the side face of the frustum being opposite in direction to the outward slope of the inside face of the driving ring and parallel thereto; a plurality of balls held by the ball cage, said balls positioned to bear on material placed on the face of the mandrel and bearing on and being driven by the sloping face of the ball driving ring.

3. In a tube drawing head, in combination: a fixed mandrel formed of two cylindrical portions connected by the frustum of a cone; an annulus of balls surrounding the mandrel; means limiting outward movement of the balls and driving them; means cooperating with the limiting means, acting resiliently, for allowing outward movement of the balls by pressure exerted in a direction opposite to that exerted when drawing.

4. In a tube drawing head, in combination: a mandrel formed of two cylindrical portions, one larger than the other joined by substantially the frustum of a cone; means for holding and adjusting the mandrel longitudinally; a plurality of balls arranged in a circle about the mandrel; a longitudinally adjustable annulus formed with an inside sloping face substantially parallel to the slope of the frustum and of larger internal diameter at the end in the direction of the base of the frustum; a casing; means for rotating the casing; a thrust bearing carried by the casing; a ball cage engaging the balls; two stops, oppositely disposed, on the ball cage, one directly engaging the thrust bearing limiting the travel of the balls down the slope of the annulus toward its smaller internal diameter, the other, including resilient means between it and the thrust bearing and acting to allow travel of the balls toward the larger internal diameter end of the annulus and resiliently pressing the balls in the opposite direction.

5. In a tube drawing head, in combination: a mandrel; a plurality of balls positioned in a circle about the mandrel; means for revolving the balls about the mandrel; and means for yieldingly limiting the outward spread of the balls; means permitting outward spread of the balls, whereby a pipe may be pushed freely over the mandrel in one direction, separating the balls, said yielding means being spring-biased to cause the balls to work the metal of the pipe against the mandrel when the pipe is drawn in an opposite direction.

6. In a pipe reducing device, in combination: a mandrel adapted to be placed within a pipe to be reduced; means for reducing the pipe including devices having a tendency to cause the pipe to revolve about the mandrel; a holding rod for positioning the mandrel formed of polygonal cross-section; a clamp formed with a bore receiving the holding rod and freely slidable on the rod, said clamp formed with a conical portion provided with a longitudinally channelled screw thread whereby the clamp when forced into the end of the pipe prevents the pipe from any considerable revolution but allows the pipe to freely move lengthwise of the rod.

7. In a drawing head, in combination: a plurality of balls arranged in a circle; a driving ring surrounding and having substantially a point bearing on the outer periphery of the balls, said ring formed with a sloping surface for making contact with the balls; means for rotating the ring; a ball cage having orifices for receiving the balls, said orifices formed with a side wall at a right angle to the said sloping surface whereby the balls rotate, by the driving force of the ring, on an axis substantially parallel to the sloping surface and at a right angle to the wall; and a mandrel positioned within the circle of balls adapted to support a pipe to be reduced against which the balls bear.

8. In a ball rolling tube reducing device, including a rotary driving ring formed with an inclined inner driving surface and reducing balls driven by said surface and a mandrel for supporting the pipe to be reduced, the combination of a ball cage for maintaining spaced relation and positioning of the balls having ball receiving orifices with the wall thereof at a right angle to the sloping driving surface.

9. In a pipe reducing device, in combination: a plurality of balls arranged in a circle; a sloping driving surface contacting with the outer periphery of the balls; a mandrel for supporting a pipe to be reduced within the circle of the balls; and a ball cage formed with orifices for receiving and positioning the balls, said orifices formed with a wall at a right angle to the sloping driving surface whereby driving of the balls by the sloping surface will cause them to revolve upon an axis at a right angle to the wall.

10. In a pipe reducing device of the type which includes a central pipe supporting mandrel, a circle of balls surrounding the mandrel, and a sloping surface for driving the balls, the combination of a ball cage for positioning and spacing the balls formed with a ball receiving opening at a right angle to the sloping surface.

11. In a ball rolling device for reducing tubes, including a rotary driving ring having an inner driving surface formed convergently toward the axis of rotatiton of the ring in the direction of drawing movement of the article to be reduced, and also including means to support and move said tube along said axis; the combination of a ball die comprising a series of reducing balls in annular arrangement between said convergent driving surface and said tube, and a combined ball cage ring and cheek having a thickness substantially equal to the length of a radius of one of said balls, and formed with orifices for the individual balls, each orifice having a cylindrical wall closely approximating the diameter of a ball and extending through said ball ring along an axis at right angles to said sloping driving surface, whereby each ball is engaged at all times by a rearwardly sloping cheek wall at a point of tangency on the ball periphery lying below a diameter of the ball parallel with said axis of drawing movement, and means to hold said ring in fixed position against the drag upon the tube during reduction.

12. In a ball rolling device for reducing tubes, including a rotary driving ring having an inner surface formed convergently toward the axis of rotation of the ring in the direction of drawing movement of the tube to be reduced and adjustable along said axis to vary the adjustive displacement of said balls relatively to said axis, said device also including means to support and move said tube along said axis, and including a ball die comprising a series of reducing balls in annular arrangement between said convergent driving surface and said tube; the combination of a ball cage ring having a thickness substantially equal to the length of a radius of one of said balls, and formed with orifices for the individual balls, each orifice having a cylindrical wall closely approximating the diameter of a ball and extending through said ball ring along an axis at right angles to said sloping driving surface, whereby driving of the balls by the sloping driving surface will cause each ball to rotate upon an axis at right angles to the wall, each ball being engaged at all times by a rearwardly sloping cheek wall at a point of tangency on its periphery lying below a diameter of the ball parallel with said axis of drawing movement, regardless of the adjustive displacement of the balls from the axis of rotation of the rings.

LOUIS H. BRINKMAN.